(12) United States Patent
Holmes (10) Patent No.: US 7,796,311 B2
(45) Date of Patent: Sep. 14, 2010

(54) SECURITY DEVICE WITH MULTIPLE HOLOGRAPHIC OR DIFFRACTION EFFECT GENERATING STRUCTURES

(75) Inventor: Brian William Holmes, Hampshire (GB)

(73) Assignee: De La Rue International Limited, Bakingstoke (GB)

( * ) Notice: Subject to any disclaimer, the term of this patent is extended or adjusted under 35 U.S.C. 154(b) by 147 days.

(21) Appl. No.: 11/791,640

(22) PCT Filed: Dec. 5, 2005

(86) PCT No.: PCT/GB2005/004660

§ 371 (c)(1),
(2), (4) Date: Jul. 23, 2007

(87) PCT Pub. No.: WO2006/061586

PCT Pub. Date: Jun. 15, 2006

(65) Prior Publication Data

US 2008/0094673 A1     Apr. 24, 2008

(30) Foreign Application Priority Data

Dec. 6, 2004   (GB) ................................ 0426724.1

(51) Int. Cl.
G03H 1/00     (2006.01)
(52) U.S. Cl. .......................................................... 359/2
(58) Field of Classification Search ..................... 359/2, 359/567; 283/86
See application file for complete search history.

(56) References Cited

U.S. PATENT DOCUMENTS 4,761,253 A    8/1988   Antes (Continued)

FOREIGN PATENT DOCUMENTS

EP           0 105 099 A1      4/1984

(Continued)

OTHER PUBLICATIONS

Bruce II et al., extract from "Standard Catalog of World Paper Money", 2008, pp. 44-49, 14th Edition, Krause Publications, Iola, WI, 2008.

(Continued)

Primary Examiner—Alessandro Amari
Assistant Examiner—Jennifer L. Doak
(74) Attorney, Agent, or Firm—Oliff & Berridge, PLC (57) ABSTRACT

A security device comprises first and second holographic or diffraction effect generating structures recorded in respective sets of substantially non-overlapping regions of a record medium. The regions of one set are interleaved with regions of the other set, whereby both interleaved line structures are substantially non-visible to the unaided eye, whereby the security device generates two or more holographic images or diffractive images which to the naked eye overlap but which are viewed from separate viewing directions around the device and normally seen by tilting the device. Each holographic image or diffraction effect in a viewing direction is generated in whole or part by the holographic or diffraction effect generating structure associated with a respective set of interleaved lines. At least one of the holographic or diffraction effect generating structures includes one or more holographically or lithographically recorded continuous boundary lines, wherein each boundary line has a line width below the normal resolution of the eye, and extends at least partly along a boundary of the holographic image or diffraction effect generating structure.

13 Claims, 3 Drawing Sheets

U.S. PATENT DOCUMENTS

| | | | | |
|---|---|---|---|---|
| 5,694,229 A | * | 12/1997 | Drinkwater et al. ............ | 359/2 |
| 2004/0135365 A1 | | 7/2004 | Schilling et al. | |

FOREIGN PATENT DOCUMENTS

| | | |
|---|---|---|
| EP | 0 766 103 A1 | 4/1997 |
| WO | WO 92/09444 | 6/1992 |
| WO | WO 93/18419 | 9/1993 |
| WO | WO 95/02200 | 1/1995 |
| WO | WO 95/04948 | 2/1995 |
| WO | WO 95/04948 A1 | 2/1995 |
| WO | WO 99/59036 | 11/1999 |
| WO | WO 99/59036 A1 | 11/1999 |
| WO | WO 02/100653 A1 | 12/2002 |
| WO | WO 2004/077468 A2 | 9/2004 |

OTHER PUBLICATIONS

500-DZD note, Nov. 9, 2009.
Another 500-DZD note with enlargement of a detail, Nov. 9, 2009.
Enlargement of the security element of the 500-DZD note, Nov. 9, 2009.
Opposition filed against the corresponding European patent No. EP 1819526 (Application No. 05813920.5) (with Translation), Sep. 10, 2009.

\* cited by examiner

LEFT CHANNEL

RIGHT CHANNEL

SECURITY DEVICE WITH MULTIPLE HOLOGRAPHIC OR DIFFRACTION EFFECT GENERATING STRUCTURES

Security documents such as bank notes now frequently carry optically variable devices (OVDs) such as diffraction gratings or holographic optical microstructures as a security feature against copy and counterfeit. This has been motivated by the progress in the fields of computer based desktop publishing and scanning which renders conventional security print technologies such as intaglio and offset printing increasingly accessible to counterfeit. A particularly good way to strengthen security documents against counterfeit is to combine security print with optically variable diffractive devices whose structures are non-copiable by scanners and which can exhibit optically variable effects such as colour changes by diffraction, apparent runs and movement effects and distinct switches between images. A particularly advantageous effect is where the OVD produces a distinct clear switch between two or more overlapping images providing a clear effect that cannot be simulated by print.

Several such classes of diffractive based security devices exist. Two common types, both based on arrays of surface diffraction gratings, are the "Exelgram" developed by CSIRO (Commonwealth Scientific and Industrial Research Organisation), Australia and the Kinegram, developed by Landis and Gyr, Switzerland. These are described in WO-A-93/18419, WO-A-95/04948 and WO-A-95/02200 for the Exelgram and U.S. Pat. No. 4,761,253 and EP-A-0105099 for the Kinegram. Both of these techniques use directly written localised surface diffraction gratings, written in the case of the Exelgram by an electron beam direct write process and in the case of a Kinegram by the recombining step and repeat process outlined in U.S. Pat. No. 4,761,253.

Both of these techniques enable one precise diffraction grating to be written into a particular area. In the case of WO-A-95/02200, a device is disclosed displaying two angularly separated but overlapping diffracted images made from two completely overlapping diffraction grating areas while WO-A-95/04948 details a diffraction grating device made from a series of tracks of diffraction grating structures that exhibits a clearly switching image where the separate images can occupy overlapping areas. Both of these devices have been used for applications on security documents such as bank notes.

Another type of device that can exhibit optical switching effects is a holographic structure manufactured using conventional interferential holographic techniques. A typical example of such a device used as a security device on a bank note is the multiple redundant hologram described in EP-A-0558574 where to maintain holographic efficiency the hologram uses spatially separated switching images.

Now for application on a security document such as a bank note, the microscopically rough surface of the paper can have a severely detrimental effect on a diffractive image given that it is typically applied as a thin layer of embossed lacquer applied using the known print process of hot stamping. To ensure the exceptional foil to paper adhesion required during banknote application, the holographic foil is often hot-stamped at pressures and temperatures which exceed those required for optimal holographic replay and gloss. In particular at such elevated hot-stamping temperatures the thermoplastic within the foil has exceeded its glass transition temperature and is in a visco-elastic or 'softened' phase, therefore the effect of the pressure applied by the stamping die is to cause the thermoplastic foil to begin re-flow and conform to the micro-topography of the paper. The roughness of the surface and paper fibre intrusion severely disrupts the integrity of the thin layer of lacquer carrying the diffractive structure, thereby severely degrading its optical efficiency. It is therefore very important that the optical efficiency of the diffractive structure is maximised which has tended to result in the use of diffractive devices, such as the Exelgram, where there is a device to achieve an optically variable effect defined by a switch between two or more overlapping images. This is because the controlled "direct write" style origination technique of an Exelgram or Kinegram allow close control of the areas of diffraction grating allowing switching overlapping images to be created from two sets of interwoven tracks (WO 95/04948) so that each microscopic area of the device only consists of one diffraction grating which, when blocked onto the rough surface of a paper document, maintains its diffraction efficiency reasonably well as it is possible to maximise the single grating modulation whereas a switching device made up of overlapping diffraction grating areas would have a lower overall diffraction efficiency due to the complicated nature of the overlapping microstructures.

An alternative approach to "direct write" style origination to achieve an optically variable effect defined by a switch between two or more overlapping images has been disclosed by De La Rue International Ltd in EP1078302. In EP1078302 a holographic security device is described comprising first and second holographic generating structures recorded in respective sets of substantially non-overlapping regions of a record medium, the regions of one set being interleaved with regions of the other set, whereby both interleaved line structures are substantially non-visible to the unaided eye, whereby the holographic security device generates two or more holographic images viewed from separate viewing directions around the device and normally seen by tilting the device, and whereby each particular holographic image in a viewing direction is generated in whole or part by the holographic structure associated with one set of interleaved lines.

The technique of interleaving two holographic generating structures to generate switching overlapping images, as described in EP1078302, is most suitable for cases where the resultant holographic images are simple geometric shapes. For more complex shapes and designs it is difficult to maintain the edge definition of the final image. The poor definition of one or both of the holographic images will make the security device less memorable to a member of the public and therefore increase the difficulty in distinguishing it from a counterfeit.

In accordance with the present invention, a security device comprises first and second holographic or diffraction effect generating structures recorded in respective sets of substantially non-overlapping regions of a record medium, the regions of one set being interleaved with regions of the other set, whereby both interleaved line structures are substantially non-visible to the unaided eye, whereby the security device generates two or more holographic images or diffractive images which to the naked eye overlap but which are viewed from separate viewing directions around the device and normally seen by tilting the device, and whereby each holographic image or diffraction effect in a viewing direction is generated in whole or part by the holographic or diffraction effect generating structure associated with a respective set of interleaved lines, characterized in that at least one of the holographic or diffraction effect generating structures includes one or more holographically or lithographically recorded continuous boundary lines, wherein each boundary line has a line width below the normal resolution of the eye, and extends at least partly along a boundary of the holographic image or diffraction effect generating structure.

The current invention describes a holographic security device that provides an improvement on the prior art device in EP1078302 by creating a linear area, comprising of a holographic generating structure, in the form of one or more external and/or internal graphical perimeter or boundary lines which define the outline of part or all of the first and/or second holographic images and/or delineate the boundaries of some smaller indicia, symbols or other such features within the first and second holographic images. The perimeter line significantly improves the edge definition of the respective holographic images and/or graphical elements within the respective holographic images and allows more complex shapes to be generated than were previously possible. In this manner the device provides greater visual impact, being more noticeable. Such an increased perception of the device assists against counterfeiting.

By holographic structures this description means structures that generate graphical images by the mechanism of diffraction of light where the original pattern has been generated by a holographic process of optical interference, whereby within the manufacturing stage of this origination process at least one component of the image may contain a rainbow hologram and where optionally at least one holographic intermediate hologram or H1 is used which enables at least one component of the resulting image optionally to contain true holographic depth effects if desired (as associated with 2D/3D or 2D rainbow holograms as known in the art). This description also applies to surface 2D structures generated by the above holographic process but constrained to lie substantially on the image plane of the final device and with the preferred option of being constrained in the range of spatial frequencies contained therein (i.e. viewing angle of replay). This forms in the limiting case of extreme constraint a holographic structure substantially similar in visual performance to a pure diffraction grating structure but subtly distinct in that on a microscopic level the microstructure will have been formed by a holographic projection process and may contain evidence of recorded laser generated speckle pattern structures.

This development allows the creation of an optical microstructure which upon illumination generates two or more complex overlapping images which can be observed by eye from at least two separate viewing directions around the device. Although this is possible using conventional holographic techniques by recording overlapping holographic images with the optical microstructure pertaining to each image simply superposed in the area of overlap, the resulting composite microstructure will always replay each component of the image with a reduced efficiency or brightness compared to a single diffractive structure. In fact, the presence of overlapping diffractive microstructures always results in a structure with a reduced optical diffraction efficiency compared to a single diffractive structure due to the presence of overlapping microstructure and always tends to witness the presence of the second "ghost" image in the overlap area due to medium saturation and a reduction in optical efficiency. This is due to the presence in the overlapping areas of two very different holographic structures with different orientations to the carrier grating frequencies. This limits the overall optical efficiency and observed brightness of the holographic image, which is particularly disadvantageous in bank note holograms where there is a severe reduction in perceived brightness after application of the hot stamping foil to the bank note. For this reason, this type of hologram is rarely used on a bank note application and instead a diffraction grating based image would often be preferred due to the retention of a greater diffraction efficiency after application.

The interleaving of the holographic generating structures allows the creation of a holographic security device (as opposed to a diffraction grating based image) with two or more very clear and bright graphical overlapping holographic images located in the same area of the device but visible at different orientations, which importantly retains a high diffraction efficiency when applied as a hot stamping foil on a bank note or other paper substrate despite the disruption to the microstructure caused by the paper roughness and fibre intrusion. This enables the efficiency and apparent brightness of each of the observed overlapping images to be comparable to that of a single holographic image device. The images also appear "solid" to the eye.

This is achieved by ensuring that each small area of the device only contains the holographic microstructure pertaining to one graphical image enabling a much greater microstructure holographic grating modulation to be achieved without visibly degrading the second graphical image by the appearance of a "ghost image" of the first graphic which would otherwise appear due to medium saturation in areas of superposed microstructures.

Importantly this allows the master holographic embossing shims and holographic hot stamping foil to be over modulated to compensate for structure relaxation and degradation due to paper roughness on application, so that the final optical microstructure on the paper is at peak diffraction efficiency.

Preferably, this is achieved by subdividing the two or more graphical images into an interlocking grid of fine lines, whose structure could be regular but is preferably more complex and at a scale size of 25-100 µm (although larger line widths are possible for larger graphic images although at 250 µm the line widths are becoming straightforwardly discernible to the unaided eye). The use of the very fine line widths of size 25-50 µm or 25-75 µm ensures that the line patterns within the images are non discernible to the unaided eye (the limiting resolution of the eye is around 20 µm, for a high contrast image, typically reduced by a factor of 3 or 4 for a lower contrast pattern to c. 80-100 µm). Another useful aspect of this invention is that because each image is truly a projected holographic image containing a recorded random speckle pattern, the apparent contrast of the fine line structure is significantly reduced by the superposition with it of a granular speckle pattern within each diffracted image, providing a significant contrast resolution in the fine line patterns and so very effectively hiding the line patterns from view by reducing the unaided eyes limiting resolution.

Any point on the image surface contains microstructure pertaining to only one graphic image, this microstructure being a holographic diffractive microstructure, being created by the interference of a diffused wave front that recreates the graphic image and a second coherent beam. A very important property of this structure is that this area is truly a holographic structure containing a range, albeit small, of spatial frequencies of microstructure and also containing a recorded speckle pattern characteristic of a holographic microstructure and also where each small area of the device replays a controlled predetermined solid core of ray angles, albeit of limited viewing angle, as opposed to a pure diffraction grating where each point of the image would replay a pure point replay. A particularly important aspect of this structure is that each graphic or component of a graphic therefore can replay a predetermined and controlled cone of rays allowing importantly the close control of view angle and parallax and angle of view.

The interleaving technique enables a purely holographic image to replay two or more overlapping switching graphic images with comparable efficiency to conventional pure diffraction grating devices. Conventional multiple graphical replay devices using purely diffraction grating techniques developed by CSIRO and Landis & Gyr generally require a complex computer controlled direct write approach to the formation of the master diffraction grating structure to ensure that the master structure contains only a single pure diffraction grating in any one area. The interleaving technique enables a comparable optical brightness, efficiency and switching appearance to be obtained from a pure hologram and holographic technique with an equivalent brightness when applied onto the rough paper surface of a bank note or similar security document.

This non-overlap of images can be obtained by splitting the image field into a set of interlocking fine line apertures, with each interleaved line aperture defining one direction component of the diffractive/holographic patterns to ensure that each small area of the device only contains one dominant diffraction grating carrier frequency to ensure a high diffraction efficiency is obtained for the image after blocking onto rough paper. A single dominant diffraction grating in each area will be less effected by degradation due to fringe competition and will also have a wide latitude on exposure/development and embossing replication enabling the structure to be over modulated in groove depth on the master shim and on the embossed foil to compensate for relaxation and degradation due to surface roughness. As a result, each separately viewed holographic image appears substantially independent of any degradation or cross talk or medium saturation effects from the other image(s). Another important aspect is that the fine line apertures are typically of a line width size below the resolution limit of the normal eye and so are essentially invisible to an observer.

An example of a security device according to the present invention will now be described and contrasted with known devices with reference to the accompanying drawings, in which:—

The initial stage, of the preferred manufacturing process for the final interleaved holographic device comprises transferring two or more images (defined as image 1 and image 2) to a computer or other central processing unit (CPU) by optically scanning or electronically reading the desired image (indicia) from a photograph, brochure, document, or other media and transmitting the image to a monitor or display screen of the CPU. The images are then masked, electronically revised and striped on the computer by electronically removing erasing, cancelling, or otherwise deleting a symmetrical pattern of spaces or pixels on the images to form masked images with a spaced array of lines comprising non-image areas with spaces of imaged areas positioned between and separating the lines. The position of the image and non-image areas is inverted for image 1 compared to image 2. The revised images are then transferred onto glass plates. Conventional holographic origination is then utilised to record a H1 onto a layer of photoresist such that a hologram of image 1 is recorded on the upper section of the photoresist defining the left channel and the hologram of image 2 is recorded on the lower section defining the right channel. The resultant H1's of image 1 and image 2 comprise of a series of closely spaced lines containing the respective holographic microstructures. A H2 of image 1 (left channel) is then recorded onto photoresist by conventional transfer from the H1 of image 1. A H2 of image 2 (right channel) is then recorded onto the same photoresist by conventional transfer from the H1 of image 2 such that the lines containing the holographic structures from image 1 are interleaved with the lines containing the holographic structures from image 2. The interleaving of the two structures is done manually with the aid of an eyepiece. The recording of H2 in the photoresist can then be used to form embossing shims for the mass production of embossed holograms.

Figure 1A:
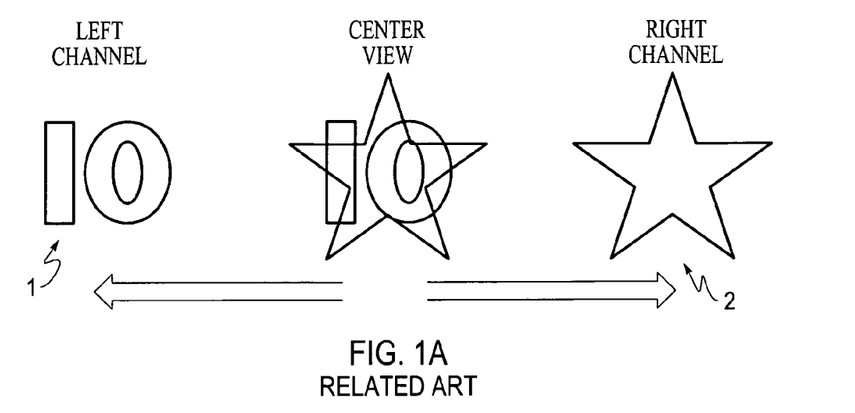
FIGS. 1A to 1E illustrate a known device and schematically show the line structures of components of the device.
Figure 1B:
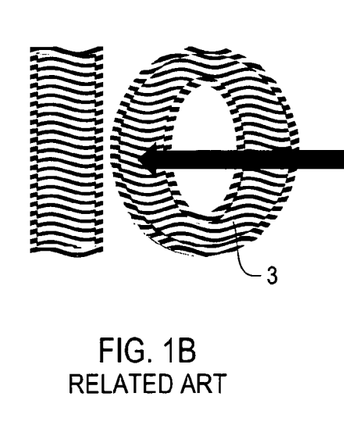
Figures 1C, 1E:
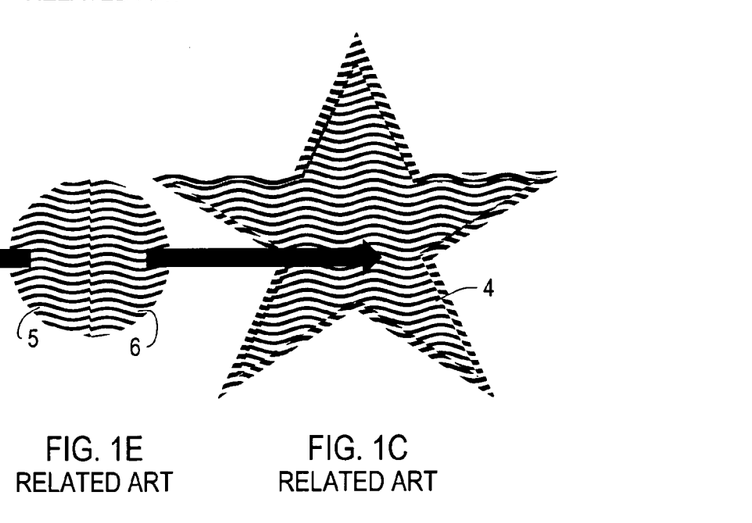
Figure 1D:
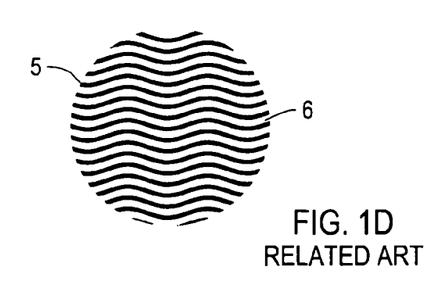

FIG. 1 shows a two channel holographic device, as described in EP 1078302, with two image channels showing overlapping switching graphics holograms of the number 10 (image 1) and a simple five pointed star (image 2), each channel being recorded as a set of very fine lines 3,4 (shown illustratively in FIGS. 1B and 1C as these line structures would normally be beneath the normal visual resolution and thus normally not visible) so that each area of the image only contains one diffractive structure with, for example, the images switching on left to right tilting (FIG. 1A). An enlargement of these non-overlapping image channels is in FIG. 1D showing the same area of the two channels of images 1 and 2 magnified to a scale where one line corresponds typically to between 20 and 120 microns depending on the individual example, showing schematically how the line structures 5 and 6 for the two areas containing each image channel are interleaved, whilst FIG. 1E, again showing a greatly magnified view of each pattern, further illustrates two spatially separate areas butted together to show how the lines 6 of one structure are offset from the lines 5 of the other structure, so that the optical microstructures corresponding to individual diffractive elements occupy essentially independent areas and do not substantially overlap.

The process of subdividing the two or more graphical images into horizontal fine lines, as illustrated in FIG. 1, is suitable for simple low resolution geometric shapes such as letters and numerals. However as the shapes become more complex the resultant holographic images will become blurred with the loss of edge definition and vertical resolution. This is no longer ideal because the edge definition of the complex shape is lost and there is no longer a distinct clear switch between the two images. One method for improving the edge definition and vertical resolution is to decrease the width of the interleaved lines. However decreasing the line width increases the difficulty in accurately interleaving the lines of holographic microstructures at the H2 transfer stage and is not a practical solution. There is therefore a need for an alternative solution that extends the application of the interleaving technique described in EP1078302 to complex graphic images.

One aspect of the current invention is to sharpen one or more of the holographic images obtained using the interleave technique by incorporating well defined edges to the image and/or component sections of that image(s). The edge definition of the image is obtained by creating a linear area, comprising of a holographic generating structure, in the form of a perimeter or boundary line. The perimeter line provides an outline for the resultant holographic image and therefore an increase in edge definition. The perimeter line comprises of the same or similar holographic microstructure to the holographic image it is defining. A characteristic of the perimeter line is that it is not visible to the naked eye, but the sharpening of the image as a result of the increased edge definition is apparent to the naked eye. In order to ensure that the perimeter line is not visible the width of the perimeter line is typically of a size below the resolution limit of the normal eye and so is essentially invisible to an observer. The width of the perimeter line is typically <100 µm and more preferably in the range 5-50 µm.

A further aspect of the current invention is that it enables the thickness of the interleaved lines to be increased because the resultant degradation in the edge definition and vertical resolution is compensated for by presence of the perimeter or delineation line. This is a particular advantage because the use of thicker lines increases the accuracy of the interleaving process. This is important because any inaccuracies in the interleaving process will result in overlapping diffractive microstructures that always results in a structure with a reduced optical diffraction efficiency compared to a single diffractive structure.

The visibility and efficiency of holographic security devices on banknotes are particularly susceptible to degradation as the surface of the banknote becomes increasing creased by manual handling during circulation. An important aspect of this invention is that the use of the perimeter line improves the definition and visibility of the resultant holographic image and thereby improves the durability of the holographic security device by increasing the time taken in circulation for the image to degrade to a point where it is no longer recognisable.

The perimeter line is incorporated into the device during the processing of the original images prior to the recording of the holographic images. As previously described, in a preferred method, the original images are transferred to a computer and electronically edited to form masked images with a spaced array of lines comprising non-image areas with spaces of imaged areas positioned between and separating the non-imaged areas. The perimeter line is then created around the outline of one or more of the images as a continuous solid area and does not contain any non-imaged areas, i.e. the perimeter line of one image is not interleaved with the holographic structures of the other images. In complex images it is also preferable to incorporate a perimeter or delineation line around component parts of the image, for example in the case of a portrait a perimeter line could be used to improve the definition of key features such as the eyes which otherwise could not be resolved using the conventional interleaving process. Once the perimeter line has been incorporated H1's are then recorded for the component images and transferred to the final H2 interleaved structure as described previously.

The fact that the perimeter line does not from part of the interleaved structure means that the perimeter line of one image will overlap with one or more of the other images. As discussed previously the presence of overlapping diffractive microstructures always results in a structure with reduced optical diffraction efficiency. For example consider the simple case where there are two switching interleaved images (image x and image y) in which one of the images (image x) has a perimeter line. The diffractive microstructure forming the perimeter line of image x will directly overlap with a localised region of the diffractive microstructure forming image y. The result of the overlap is the appearance of a "ghost" image within image y of the perimeter line for image x due to medium saturation ("burn out") and reduced optical efficiency in areas of superposed microstructures. A key aspect of this invention is that the perimeter line is either indiscernible or barely discernable to the unaided eye and therefore the detrimental effect of "burn-out" on the other images is not resolvable and has no aesthetic impact on image quality. The width of the perimeter line is typically <100 µm and more preferably in the range 5-50 µm.

A preferred embodiment of this device is where the holographic structure is formed as a surface relief for manufacture by embossing and casting processes and for application to documents of value as surface relief structures. This could be, for example, in the form of a label or applied as a hot stamping foil or potentially directly embossed into a layer on the surface of a document where this technique will provide a major improvement in performance for such devices when they are being created holographically. However, other forms of holographic recording known in the art, such as reflection holograms, could also be used.

In a typical device the interleaved fine line structures and the perimeter line structures are of a size below the normal size resolution of the unaided human eye. Also in a typical device the interleaved graphical image components are localised on the surface plane of the hologram as surface relief 2D rainbow holograms.

A typical security hologram such as a typical 2D/3D hologram as known in the art (e.g. G. Saxby, Practical Holography, Publisher Prentice Hall) can be created from several holographic components—these various components will consist of different graphical subdivisions recorded normally with different spatial frequencies and possibly orientations of the rainbow hologram carrier frequency gratings to provide for example different viewing directions and/or different relative colours by dispersion.

This is a common technique for embossed holograms of 2D/3D images, where to produce relative holographic colour effects a piece of artwork would be split into separate graphical areas each recorded in a different rainbow hologram carrier grating spatial frequency to provide different areas of different replay angles and dispersions, using the different dispersions to provide relative colour effects, and each separate artwork subdivision recorded with a different carrier grating spatial frequency and/or different, direction can be described as a "holographic component" of any particular holographic image, with the sum of the replays of these holographic components making up the whole holographic image observed.

A useful aspect of the interleaved nature of the current invention is the potential to alter the line widths ascribed to each diffractive channel to achieve the required relative brightness between views whilst retaining the ability to fully saturate both gratings to achieve optimum efficiency and groove depth, in contrast to a normal hologram where it would not be possible to saturate fully both gratings due to medium saturation ("burn out") and the use of the relative brightness to achieve the desired brightness balance between viewing channels. This approach enables a two channel hologram to be over-modulated in terms of grating groove depth thus enabling a banknote with a two or more channel hologram to obtain the same degree of grating over-modulation as can be produced by a purely direct written diffraction grating device. So this technique provides a method of producing the whole final diffractive structure simultaneously using holographic transfer techniques using separated holograms recorded in non-overlapping areas by using a very fine line grid pattern well below eye resolution.

At a microscope level (×50), these structures according to the invention contain a characteristic random speckle pattern. The only way to create this type of image would be by highly sophisticated holographic projection techniques involving close control of projection focus and registration in both the parallax axis and dispersion or colour axis far in excess of the capability of a commercial holographic laboratory. These devices would therefore on microscopic level, by the speckle structure, be obviously different from a diffraction grating device, whereby under a microscope the size being replayed would contain a characteristic granular pattern. Another advantage of using a holographic technique and recording a granular speckle pattern in the image is that this granular pattern is a major factor in reducing the visibility of the perimeter lines and the interleaved line grid structure which can be made completely invisible to the naked and modestly aided (×10) eye.

A further usage of this technique would be in the creation of holographic stereograms—a common technique used to create apparent three dimensional hologram from many (c.20-200) views of a subject (e.g. see "Practical Holography", by G Saxby). In a conventional holographic stereogram, many different views (20-200) of a subject are recorded together to provide a composite 3D view of a real subject. However, this technique normally results in severe medium saturation and "burn out" being visible due to the many different overlapping images. One useful application of the interleaving technique would be to split one viewing channel into several separate interleaved structures (say 3 or 4) to reduce the range of spatial frequencies in any particular area of the device to increase brightness. Thus, for example, one area of the device would only contain the left views of the subject over a certain angle, say 10 or 20 views, all of which would have similar carrier grating spacings and orientations so reducing medium saturation ("burn out") and so increasing brightness.

A potential drawback with this technique is that splitting a viewing channel into separate interleaved structures reduces the edge definition and vertical resolution of the image, and this degrades further as the number of interleaved structures is increased for example up to 10 rather than just 3-4. The current-invention of forming a perimeter line around the images created by the interleaved structures compensates for the loss in edge definition and vertical resolution created by the interleaved technique thus allowing more interleaved structures to be incorporated and therefore further reducing the range of spatial frequencies in any particular area of the device to increase brightness. This is especially relevant with the advent of e-beam technology where the improved resolution of e-beam will more easily allow the creation of a higher number of interleaved structures. So the combination of the interleaving technique and the incorporation of the perimeter line could be applied to holographic stereograms to reduce the number of overlapping images on each area of the medium and so increase image brightness—again the key being to use line patterns beneath the normal resolution of the human eye.

An additional advantage of the interleaved hologram structure is to provide an enhancement in replay efficiency and hence brightness of the image over and above that which would be possible from a purely sinusoidal diffraction grating structure. The interleaved approach enables the microstructure applicable to each channel of an overlapping multi-channel image to be stored in a substantially independent spatial area of substrate. This reduces fringe competition in these areas as stated above thus producing substantially higher efficiency optical components for the image. However, this also enables non-sinusoidal grating structures to be recorded in these areas. (i.e. structures which have substantially different diffraction efficiencies between the +1 and −1 diffracted orders, in contrast to sinusoidal grating structures which have an equal efficiency between diffracted orders). A particular type of useful structure is one where the desired diffractive order is enhanced over the undesired order thus producing an enhancement in optical brightness of the observed image. Such a structure is typically known as a "blazed" diffractive order—this is known in the field of the production of pure diffraction gratings for spectroscopy (e.g. M. Hutley, "Diffraction Gratings", Academic Press 1982) but not in image holographic structures replaying graphical images, particularly where the holographic image switches between two overlapping graphics, images where normally such enhanced efficiency structures cannot be accessed due to the nature of the image holographic processes and fringe competition. In one typical geometry a blazed image holographic structure is recorded for a preferential efficiency enhancement by recording an interference pattern between a reference beam, and an object beam with both beams impinging on the recording material from the same side of the geometric normal. Note that the interleaved process combined with the H1-H2 preferred origination process enables each component of an interleaved hologram to be recorded with an individually different blaze angle to preferentially enhance the diffraction efficiency in the desired viewing order for this component. This is an improvement over the two previous known systems designed by Landis and Gyr and CSIRO mentioned above. The Landis and Gyr system by stamping down small areas of linear grating at different angles can only use substantially the same sinusoidal structure for any particular spatial frequency—the CSIRO system cannot produce a profiled blazed grating structure and so cannot enhance the desired orders— the advantage of the interleaved structure combined with an H1-H2 process is that each individual element of the interleaved hologram is automatically blazed in the correct orientations in the recording geometry.

Thus, one or both structures may comprise blazed holographic structures so as to enhance the diffraction efficiency of the respective structure.

Holographic security devices according to the invention can be used for a wide variety of purposes to add security to documents and articles. As already mentioned, they are particularly suited for use with documents or articles having relatively rough surfaces being made of paper and the like but can also be used with other materials such as plastics. Examples of articles which can be secured using such devices are passports, passbooks, tickets, permits, licenses, financial transaction cards including cheque guarantee cards, charge cards, credit cards, cash withdrawal cards, electronic funds transfer cards, service entitlement cards, personal or article identification cards, prepayment cards, telephone cards, variable e.g. decrementing value cards, bonds, fiscal documents, bank notes, cheques including travelers cheques, vouchers, brand identification labels, tamper resisting or indicating labels.

The device is conveniently constructed in the form of a transfer assembly such as a hot stamping foil enabling it to be transferred onto a document or article to be secured. In that situation, typically the device carries a heat sensitive adhesive (or pressure sensitive adhesive) on its exposed surface.

Further security of an article, such as a document of value, to which the device can be applied, is achieved by including the device in a generic pattern with a multiplicity of the devices.

The application of the current invention is not limited to overlapping holographic generating structures and the same principle can be extended to any diffractive optical device comprising overlapping of multiple fringes that are subject to a reduction in optical efficiency due to medium saturation. This can include, and is not limited to, dot matrix techniques and electron beam writing techniques.

Figure 2A:
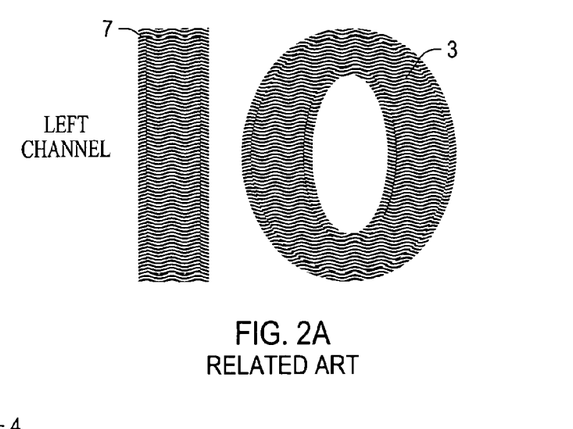
FIGS. 2A to 2C illustrate another known device.
Figure 2B:
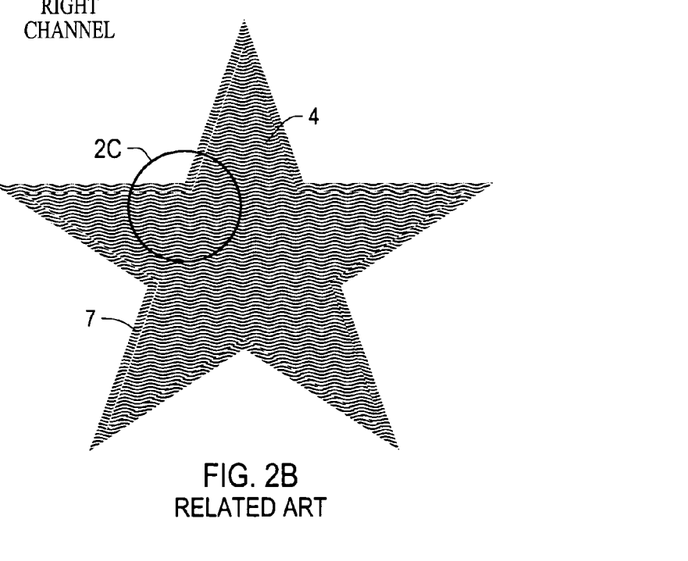
Figure 2C:
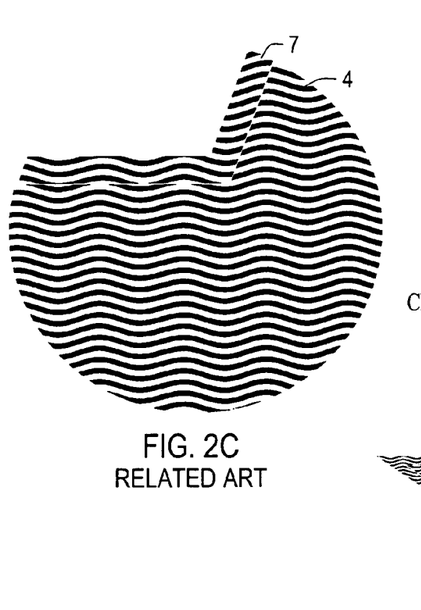

FIG. 2 shows a more detailed view of the two image channels in FIG. 1, with each channel being recorded as a set of very fine periodic grid lines 3,4 where the white lines in the Figure represent the image areas and the dark lines represent the non-image areas (shown illustratively in 2A and 2B as these line structures would normally be beneath the normal visual resolution and thus normally not visible). In this case the two images have a conventional outline 7 that is of a different colour or tint than the main image. A conventional outline increases the definition and clarity of the image. However because the conventional outline is visible to the naked eye the detrimental effects of "burn out" and reduced optical efficiency in areas of superposed microstructures will also be visible to the naked eye. It is therefore necessary to produce the outline as a spaced array of lines comprising non-imaged areas with spaces of imaged areas positioned between and separating the non-imaged areas. The magnified view in FIG. 2C shows that the outline is recorded as a set of very fine periodic grid lines. In order that the outline can be visualised in a black and white figure the grid lines in the outline have been offset from the grid lines in the main image whereas in reality the grid lines of the outline and main image run continuously into each other. The lines in the outline and the main image of image 1 are interleaved with the lines in the outline and main image of image 2 such that the optical microstructures corresponding to individual diffractive elements occupy essentially independent areas and do no substantially overlap. The interleaving of the conventional outline with the other image limits its use to simple low-resolution geometric shapes because as the complexity increases the interleaved outline will become blurred with the loss of edge definition and vertical resolution.

Figure 3:
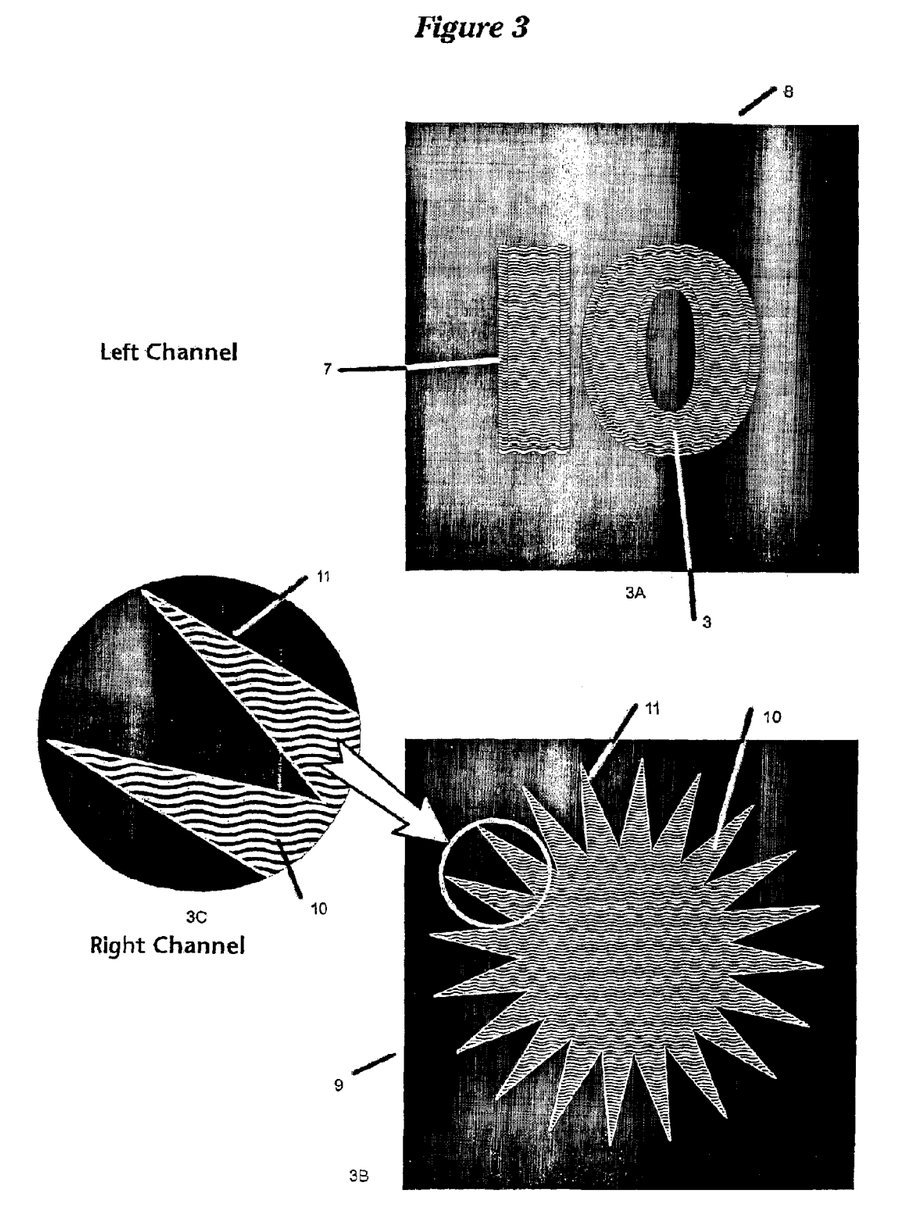
FIGS. 3A to 3C illustrate an example of a device according to the invention.

FIG. 3 shows a further two channel holographic device where the holographic image switches between a simple image of the number 10 (image 8) and a more complex image of a twenty-point star (image 9). As previously described for FIGS. 1 and 2 the number 10 is recorded as a set of very fine lines 3 and comprises a conventional outline 7 of a different tint or colour (FIG. 3A). The white lines in the main body of the number 10 represent the image areas and the dark lines represent the non-image areas and as in FIG. 2 the grid lines in the outline have been offset from the grid lines in the main image in order that the outline can be visualised.

FIG. 3B illustrates that the image of the twenty-point star is also recorded as a set of very fine lines 10 that are subsequently interleaved with the fine lines of the number 10 so that each area of the overlapped image only contains one diffractive structure with, for example, the image switching on left to right tilting. However the complexity of the star means that the interleaving process will result in a significant blurring of the image due to a loss of edge definition and vertical resolution. The edge definition of the star is significantly improved by creating a perimeter line 11 around the star comprising of the same or similar holographic microstructure to the holographic image it is defining. The white lines in FIG. 3B represent the image areas and the dark lines represent the non-image areas (shown illustratively as these line structures would normally be beneath the normal visual resolution and thus normally not visible). The magnified view in FIG. 3C shows the perimeter line as a continuous white line that does not contain any fine periodic grid lines and therefore does not form part of the interleaved structure. The perimeter line 11 will therefore overlap with the fine image lines 3 of the number 10 but because the perimeter line is not straight forwardly discernible to the unaided eye the detrimental effect of "burn-out" on the image of the number 10 is not resolvable.

This example is illustrative only and there are numerous other possibilities.

The invention claimed is:

1. A security device comprising first and second holographic or diffraction effect generating structures recorded in respective sets of substantially non-overlapping regions of a record medium, the regions of one set being interleaved with regions of the other set,
    whereby both interleaved line structures are substantially non-visible to the unaided eye,
    whereby the security device generates two or more holographic images or diffractive images which to the naked eye overlap but which are viewed from separate viewing directions around the device and normally seen by tilting the device, and
    whereby each holographic image or diffraction effect in a viewing direction is generated in whole or part by the holographic or diffraction effect generating structure associated with a respective set of interleaved lines,
    characterized in that
    at least one of the holographic or diffraction effect generating structures includes one or more holographically or lithographically recorded continuous boundary lines which are not interleaved with said sets of regions,
    wherein each boundary line has a line width below the normal resolution of the eye, and extends at least partly along a boundary of the holographic image or diffraction effect generating structure.

2. A device according to claim 1, wherein the at least one boundary line lies along an external boundary of the holographic or diffractive image.

3. A device according to claim 1, wherein at least one boundary lies along an internal boundary of the holographic or diffractive image.

4. A device according to claim 1, wherein at least one boundary line extends fully along its respective boundary.

5. A device according to claim 1, wherein the width of the boundary line is less than 100 microns.

6. A device according to claim 5, wherein the width of the boundary line is in the range 5-50 microns.

7. A device according to claim 1, wherein the boundary line contains no grid lines or other periodic pattern.

8. A document carrying a security device according to claim 1.

9. A document according to claim 8, the document having a paper substrate.

10. A document according to claim 8, wherein the document comprises a document of value chosen from the group comprising passports, passbooks, tickets, permits, licenses, financial transaction cards including cheque guarantee cards, charge cards, credit cards, cash withdrawal cards, electronic funds transfer cards, service entitlement cards, personal or article identification cards, prepayment cards, telephone cards, variable e.g. decrementing value cards, bonds, fiscal documents, bank notes, cheques including travelers cheques, vouchers, brand identification labels, tamper resisting or indicating bales.

11. A hot stamping foil comprising a security device according to claim 1.

12. A label comprising a security device according to claim 1, and an adhesive for securing the label to an article.

13. A device according to claim 1, wherein the respective sets are individually recognizable.

* * * * *